United States Patent
Calvin

(10) Patent No.: US 11,255,082 B1
(45) Date of Patent: *Feb. 22, 2022

(54) WASTE DISPOSAL DOCKING SYSTEM FOR RECREATIONAL VEHICLES AND METHOD OF USE

(71) Applicant: Jonathan Edward Calvin, Highland Village, TX (US)

(72) Inventor: Jonathan Edward Calvin, Highland Village, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/935,894

(22) Filed: Jul. 22, 2020

Related U.S. Application Data

(63) Continuation of application No. 16/129,120, filed on Sep. 12, 2018, now Pat. No. 10,760,257.

(51) Int. Cl.
*E03F 1/00* (2006.01)
*B60R 15/00* (2006.01)

(52) U.S. Cl.
CPC .............. *E03F 1/008* (2013.01); *B60R 15/00* (2013.01); *Y10T 137/6899* (2015.04); *Y10T 137/6918* (2015.04)

(58) Field of Classification Search
CPC .... E03F 1/008; B60R 15/00; Y10T 137/6855; Y10T 137/6881; Y10T 137/6918; Y10T 137/6947; Y10T 137/6899
USPC .............. 137/351, 899, 615, 355.12, 355.16, 137/355.24
See application file for complete search history.

(56) References Cited

U.S. PATENT DOCUMENTS

| | | | | |
|---|---|---|---|---|
| 3,712,331 A ‡ | 1/1973 | Otto | .......................... | B60P 1/60 137/355.16 |
| 4,844,121 A ‡ | 7/1989 | Duke | ..................... | B67D 7/002 137/615 |
| 5,023,959 A ‡ | 6/1991 | Mercer | ................... | B60R 15/00 137/355.16 |
| 5,653,262 A ‡ | 8/1997 | Hanemaayer | ........... | B60R 15/00 137/355.16 |
| 10,760,257 B2 * | 9/2020 | Calvin | .................... | E03F 1/008 |
| 2004/0112432 A1 ‡ | 6/2004 | Swarts | .................... | B60R 15/00 137/355.12 |
| 2004/0112448 A1 ‡ | 6/2004 | Faahs | ........................ | E03F 1/00 137/899 |
| 2012/0160343 A1 ‡ | 6/2012 | Penner | .................... | E03F 1/008 137/351 |
| 2014/0182712 A1 ‡ | 7/2014 | Penner | .................... | E03F 1/008 137/351 |
| 2016/0109047 A1 ‡ | 4/2016 | Swarts | .................... | B60R 15/00 137/315.01 |

\* cited by examiner
‡ imported from a related application

*Primary Examiner* — Kevin F Murphy
*Assistant Examiner* — Jonathan J Waddy
(74) *Attorney, Agent, or Firm* — Leavitt Eldredge Law Firm

(57) ABSTRACT

A waste disposal docking system for a vehicle includes a septic tank hose to attach to and extend from a septic tank hose connection fitting of the vehicle; a coiled metal extension device secured to a housing attached to the vehicle and engaged with an end of the septic tank hose; and a control system having a motor engaged with the coiled metal extension device to extend and contract the coiled metal extension device; the control system with the motor extend and contract the septic tank hose to and from a sewer cleanout station.

1 Claim, 4 Drawing Sheets

WASTE DISPOSAL DOCKING SYSTEM FOR RECREATIONAL VEHICLES AND METHOD OF USE

BACKGROUND

1. Field of the Invention

The present invention relates generally to waste disposal systems of recreational vehicles (RVs), and more specifically, to a waste disposal docking system for RVs, including motor homes, travel trailers, fifth wheels, and the like.

2. Description of Related Art

Waste disposal systems of RVs are well known in the art and are effective means to empty black and gray water from an RV. For example, FIG. 1 depicts a diagram 101 of a conventional black and gray water disposal having black and gray water holding tanks 103, 105 receiving wastewater from one or more of a toilet 107, a lavatory sink 109, a kitchen sink 111, and a tub/shower 113. During use, a septic hose (not shown) is hooked up to a valve 115 to empty the waste water into a sewer disposal site.

One of the problems commonly associated with system 101 is limited use. For example, the user typically completes this process manually, wherein the user physically engages the septic hose, and opens the valve to release the waste water. Further, the user manually engages the end of the septic hose with the disposal site. This process can be unpleasant.

Accordingly, although great strides have been made in the area of waste disposal systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 1 is a diagram of a conventional waste disposal system of an RV or the like;

Figure 1:
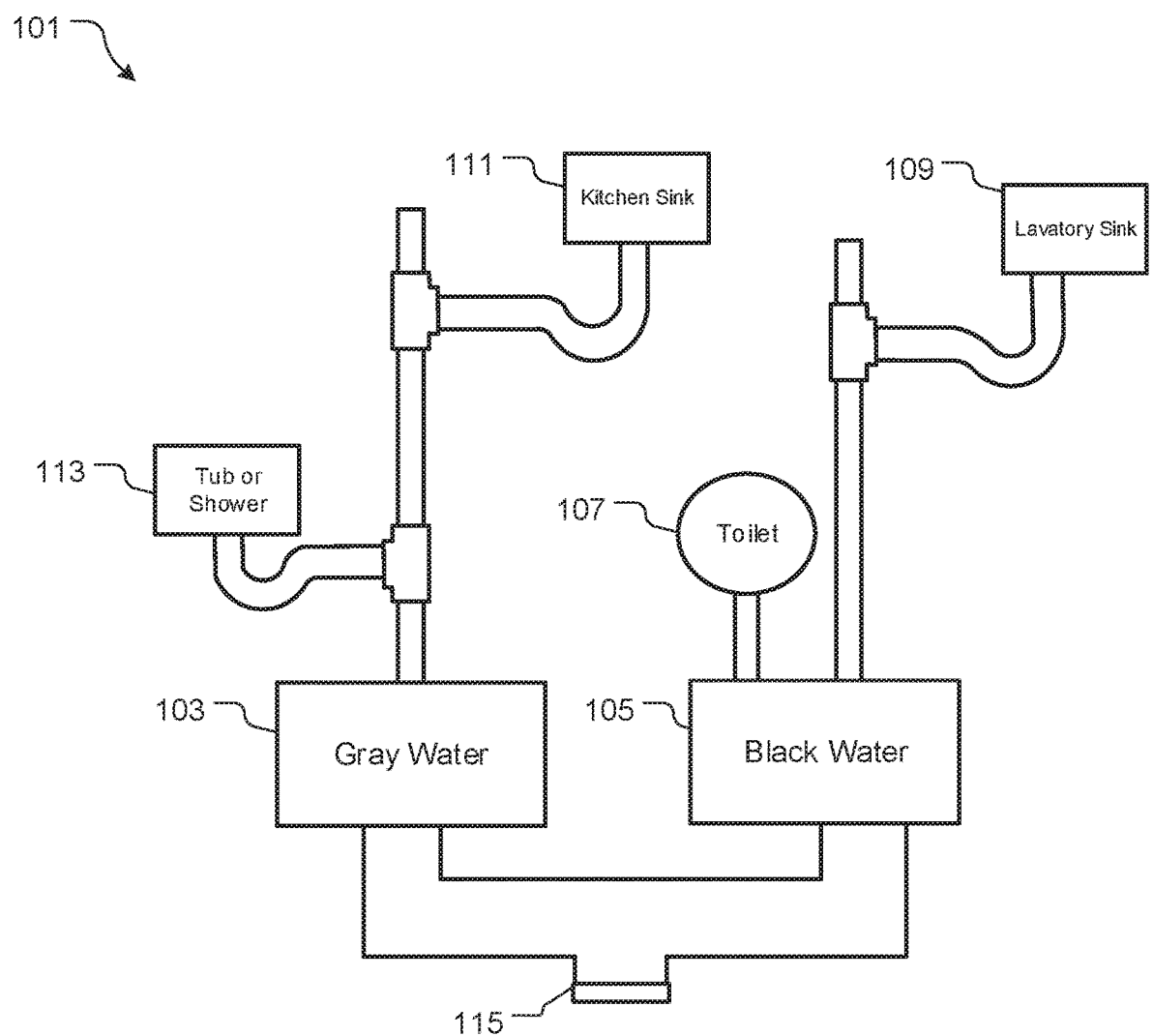

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional waste disposal systems. Specifically, the present invention provides for a docking system that provides for automatic connection of the wastewater tanks to a sewer cleanout station. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
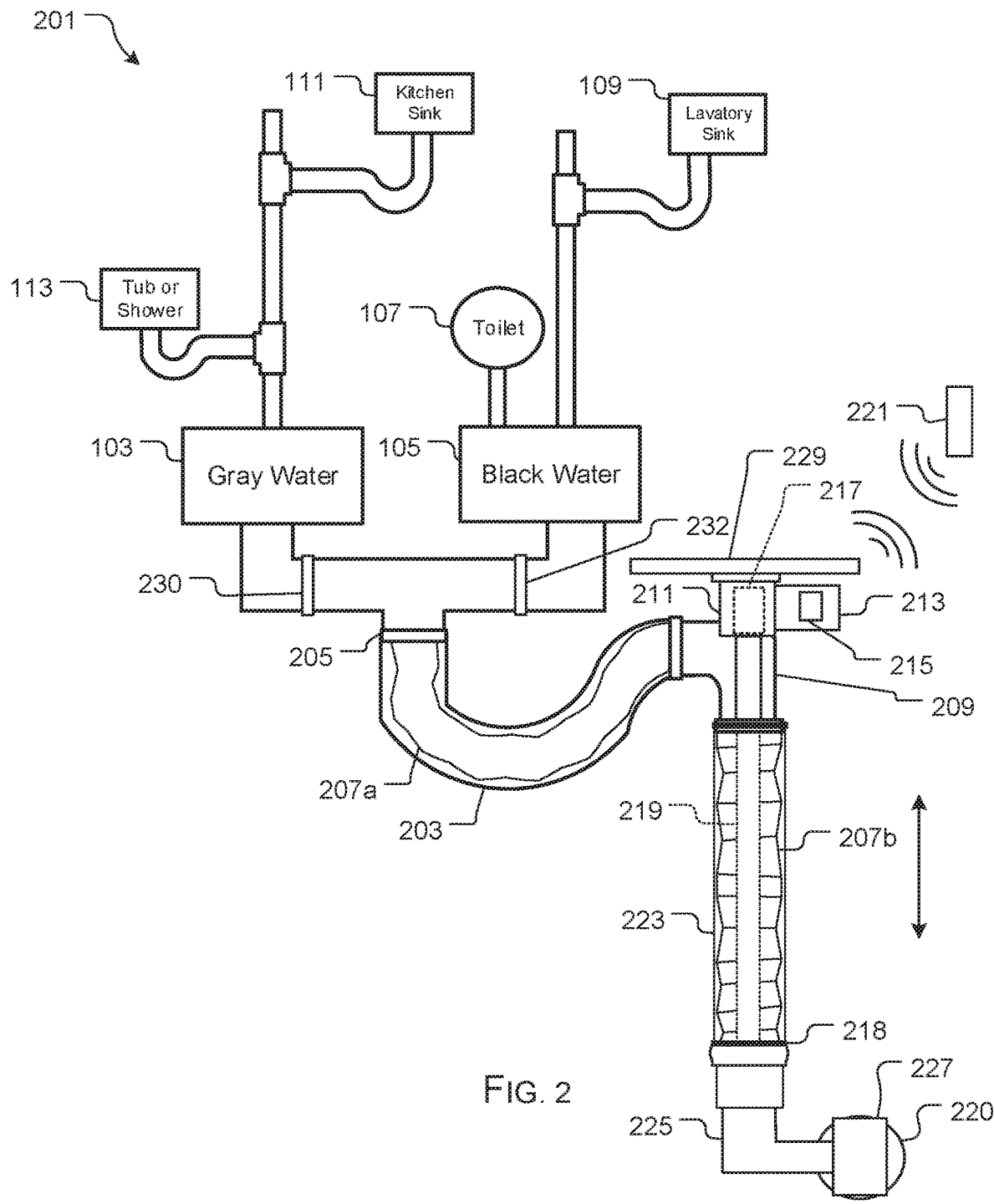
FIG. 2 is a simplified diagram of a waste disposal docking system in accordance with a preferred embodiment of the present application.

Referring now to the drawings wherein like reference characters identify corresponding or similar elements throughout the several views, FIG. 2 depicts a diagram of a waste disposal docking system 201 in accordance with a preferred embodiment of the present application. It will be appreciated that system 201 overcomes one or more of the above-listed problems commonly associated with conventional waste disposal systems.

In the contemplated embodiment, system 201 includes the black and gray water holding tanks and sources of waste water described above. In the preferred embodiment, a first sleeve 203 is secured to the septic tank hose connection fitting 205 and surrounds a first portion of a septic hose 207. It should be appreciated that the sleeve can be clamped or otherwise secured in place. The septic hose 207 extends through the first sleeve and further engages with a joint 209. In one embodiment, the septic hose extends through the joint. As shown, in the preferred embodiment, the joint is a 90 degree PVC joint, however, it is contemplated that alternative embodiments could have alternative degrees of connection.

In the preferred embodiment, a housing 211 is located near and/or connected to joint 209, the housing having a motor 213 and control system 215 associated therewith. In addition, system 201 includes an extension device 217 having a coiled metal extension 219 configured to be extended and re-coiled from the housing 211 via the motor 213. It should be appreciated that the coiled metal extension extends out and back towards the housing based on commands received from the control system.

In the preferred embodiment, the extension device 217 is engaged with the septic hose 207 at a second end 218 and thereby is configured to push and pull the hose away from and towards the housing. It should be appreciated that the extension device 217 can be permanently, or removably affixed to the hose by any known or contemplated means. This feature allows for the user to extend and contract the septic hose toward a sewer cleanout station 220, without having to physically touch or engage the hose.

In some embodiments, the control system 215 is configured to wirelessly communicate with a remote 221 (which could be a mobile phone/computer or the like), thereby allowing for the user to activate the system from a remote distance.

It should be appreciated that one of the unique features believed characteristic of the present application is the extension device, being configured to extend and contract the hose. It should be appreciated that the extension device can further be able to move the hose from side to side and/or up and down, thereby allowing for the user to direct the hose in the desired direction to engage with the sewer cleanout station 220.

In the preferred embodiment, a second sleeve 223 is attached to the joint 209 and is configured to further surround hose 207 and supply support thereto. Again, this sleeve can be clamped or otherwise secured in place.

In some embodiments, a nozzle 225 is attached to the hose, wherein the nozzle 225 is configured to engage with a docking port 227, thereby further reducing any manual interaction with the waste disposal system.

It should be understood and appreciated that the various components described herein could be altered as aesthetical, manufacturing, or functional considerations require. However, in the preferred embodiment, it is contemplated that the coiled metal extension is composed of 0.020 steel ribbon, such as spring steel that is molded into a curved shape. This particular thickness will give the extension enough strength to extend out ten to fifteen feet from the housing and allows for the septic hose to expand out to the sewer cleanout station.

Further, in the preferred embodiment, the housing 211 and extension device 217 are mounted to a vehicle frame 229 in such as way as to allow up, down, and side to side movement via one or more actuators/motors/gears/combination thereof or the like. In yet additional embodiments, it is contemplating having automatic valves 230, 232 in further communication with the control system and or remote, thereby allowing for remote opening and closing of the valves.

It is contemplated that the first and second sleeves can be composed of various materials, however, one particular material is nylon, the nylon being light weight enough to extend and contract easily but having the strength to add support to the hose. The nylon sleeves help prevent snaking of the hose as it is extended and contracted.

It should be appreciated that in a simplified embodiment, the waste disposal system may only require the septic tank hose 207 which is attached to and extends away from the vehicle; a coiled metal extension device 219 engaged with an end of the septic tank hose 207, a motor 213 engaged with the coiled metal extension device 219, and a control system to operate the motor. In this simplified embodiment, the motor will activate movement of the coiled metal extension such that the coiled metal extension moves an end of the septic tank hose to the sewer cleanout.

Figure 3:
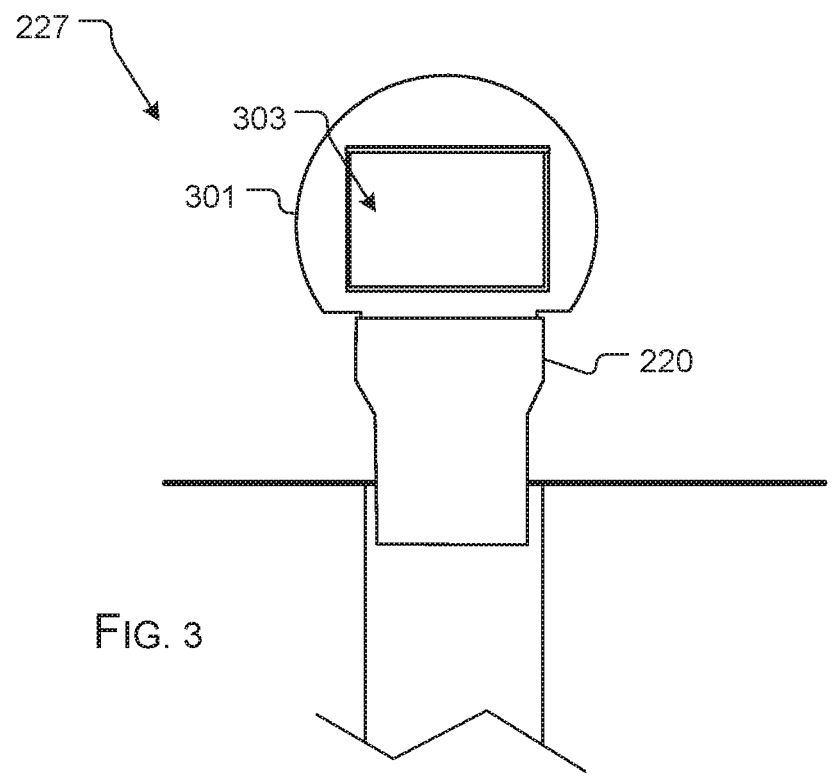
FIG. 3 is a front view of a docking port of FIG. 2.

In FIG. 3 a front view of a docking port 227 is shown, wherein the docking port 227 engages with a sewer cleanout station 220 and includes body 301 and a spring loaded door 303. The docking port 227 allows for a nozzle (attached to the end of the septic hose) to engage therewith. In the preferred embodiment, the nozzle is composed of rubber, and has a 90 degree angle, wherein the nozzle tappers, to engage with either the docking port 227 or directly with the sewer cleanout station 220 with a tight seal so as to prevent smell and liquid from escaping.

Figure 4:
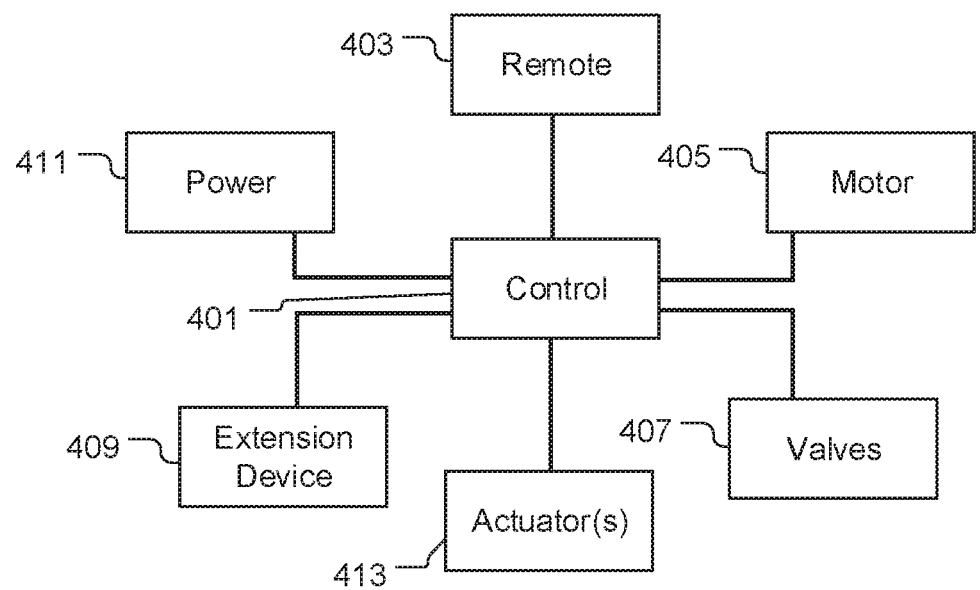
FIG. 4 is a schematic of the control system of FIG. 2.

In FIG. 4, a simplified schematic depicts the features discussed herein in relation to the control system 401. The control system 401 is in communication with a remote 403, a motor 405, one or more valves 407, the extension device 409, a power source 411; and one or more actuators 413. It should be appreciated that these features allow for the user to automatically connect the septic hose to the waste holding tanks, as well as the sewer cleanout station, without having to manually connect the various components.

Figure 5:
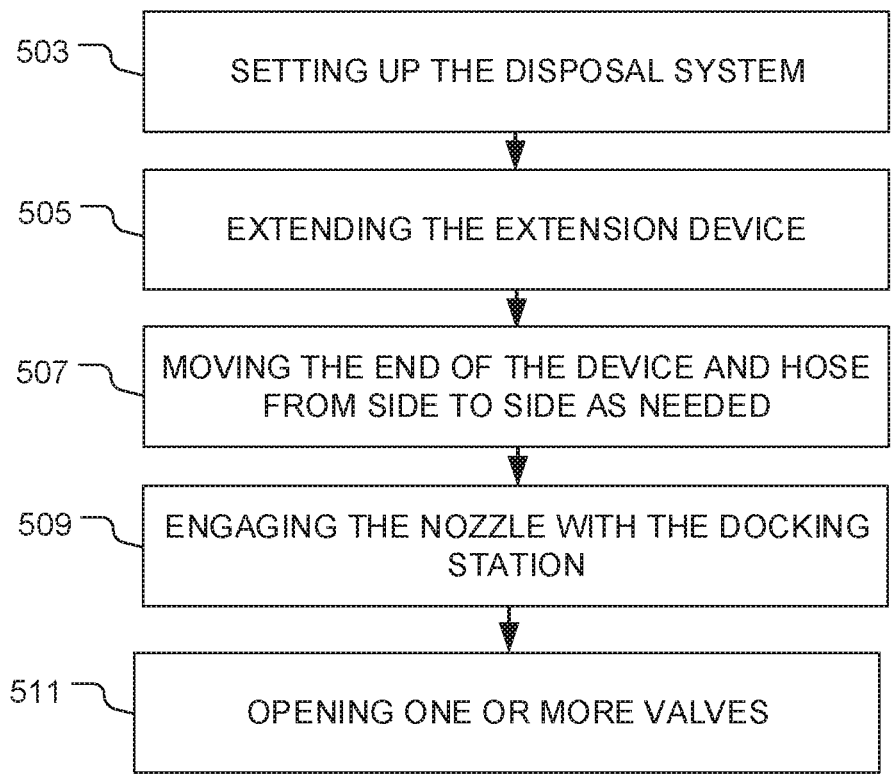
FIG. 5 is a flowchart of the method of use of the system of FIG. 2.

In FIG. 5, a flowchart 501 depicts the method of use of system 201. During use, the user sets up the disposal system, and proceeds to extend out the extension device and hose, as shown with boxes 503, 505. The user can use the remote and the control system to manipulate the extension device, and thereby engage the nozzle with either the cleanout station, or the docking station, as shown with boxes 507, 509. The one or more valves are then opened to allow emptying of the black and gray water holding tanks, as shown with box 511.

It must be understood that the waste disposal docking system can be fitted and easily configured for use with any waste disposal vehicle, or the like, wherein there is a waste outlet, such as has been described herein.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A waste disposal docking system for a vehicle, the system comprising:
    a septic tank hose configured to attach to and extend from a septic tank hose connection fitting of the vehicle;
    a coiled metal extension device secured to a housing attached to the vehicle and engaged with an end of the septic tank hose; and
    a control system having a motor engaged with the coiled metal extension device, the motor is configured to extend and contract the coiled metal extension device;
    wherein the control system with the motor extend and contract the septic tank hose to and from a sewer cleanout station.

* * * * *